(12) United States Patent
Cattaneo

(10) Patent No.: US 11,293,469 B2
(45) Date of Patent: Apr. 5, 2022

(54) JOINT FOR THE FIRM INTERCONNECTION OF A FIRST AND A SECOND PANEL OF FURNITURE AND OTHER FURNISHING ITEMS

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 478 days.

(21) Appl. No.: 16/307,525

(22) PCT Filed: Jun. 16, 2017

(86) PCT No.: PCT/EP2017/064798
§ 371 (c)(1),
(2) Date: Dec. 6, 2018

(87) PCT Pub. No.: WO2018/007128
PCT Pub. Date: Jan. 11, 2018

(65) Prior Publication Data
US 2019/0345965 A1     Nov. 14, 2019

(30) Foreign Application Priority Data

Jul. 7, 2016 (IT) .................. 102016000070959

(51) Int. Cl.
  *F16B 12/20* (2006.01)
  *F16B 5/00* (2006.01)
  *F16B 12/14* (2006.01)
  *F16B 35/00* (2006.01)
(52) U.S. Cl.
  CPC ........ *F16B 12/2063* (2013.01); *F16B 5/0024* (2013.01); *F16B 12/14* (2013.01); *F16B 35/005* (2013.01); *F16B 2012/145* (2013.01)

(58) Field of Classification Search
  CPC ............ F16B 12/2063; F16B 2012/106; F16B 2012/145; F16B 5/0024; F16B 2005/0678; F16B 12/2009; F16B 2012/2018; F16B 12/2036; A47B 95/008
  See application file for complete search history.

(56) References Cited

U.S. PATENT DOCUMENTS

| | | | | |
|---|---|---|---|---|
| 3,695,655 A | * | 10/1972 | Wippermann | ...... F16B 12/2063 |
| | | | | 403/403 |
| 4,047,822 A | * | 9/1977 | Lehmann | ............... F16B 5/0092 |
| | | | | 403/187 |
| 4,599,011 A | * | 7/1986 | Tashiro | ................. F16B 35/041 |
| | | | | 403/245 |

(Continued)

FOREIGN PATENT DOCUMENTS

| | | | |
|---|---|---|---|
| DE | 2230693 A1 * | 1/1974 | .......... F16B 12/2054 |
| DE | 2624273 | 12/1977 | |

(Continued)

*Primary Examiner* — Matthew R McMahon
(74) *Attorney, Agent, or Firm* — Themis Law

(57) ABSTRACT

A joint for firmly interconnecting a first panel and a second panel of furniture and other furnishing items positioned perpendicular to each other is provided with at least one fixing element coupled to the first panel and includes a plurality of interconnection and blocking components for joining and firmly blocking the two panels together, wherein, in the joint, the plurality of components lie on the same plane, which is parallel and interspaced with respect to the first panel and perpendicular with respect to the second panel.

8 Claims, 3 Drawing Sheets

(56) References Cited

U.S. PATENT DOCUMENTS

| | | | |
|---|---|---|---|
| 4,634,309 A | | 1/1987 | Dewey |
| 4,826,345 A | * | 5/1989 | Salice ................. F16B 12/2063 403/231 |
| 4,886,326 A | * | 12/1989 | Kuzyk ............... A47B 47/0041 312/257.1 |
| 4,990,020 A | * | 2/1991 | Matsui ............... F16B 12/2036 403/20 |
| 5,472,269 A | * | 12/1995 | Novikoff ................ A47B 21/00 312/195 |
| 5,718,493 A | * | 2/1998 | Nikolai ................ A47B 95/008 312/245 |
| 6,148,569 A | * | 11/2000 | Giovannetti ............ F16B 7/046 403/231 |

FOREIGN PATENT DOCUMENTS

| | | | | |
|---|---|---|---|---|
| DE | 3914087 A1 | * | 10/1990 | .......... A47B 95/008 |
| EP | 0930436 | | 7/1999 | |
| EP | 2980423 A1 | * | 2/2016 | .......... F16B 12/2063 |
| ES | 2464615 A1 | * | 6/2014 | .......... A47B 95/008 |
| FR | 2333991 | | 7/1977 | |
| GB | 2516374 | | 1/2015 | |

\* cited by examiner

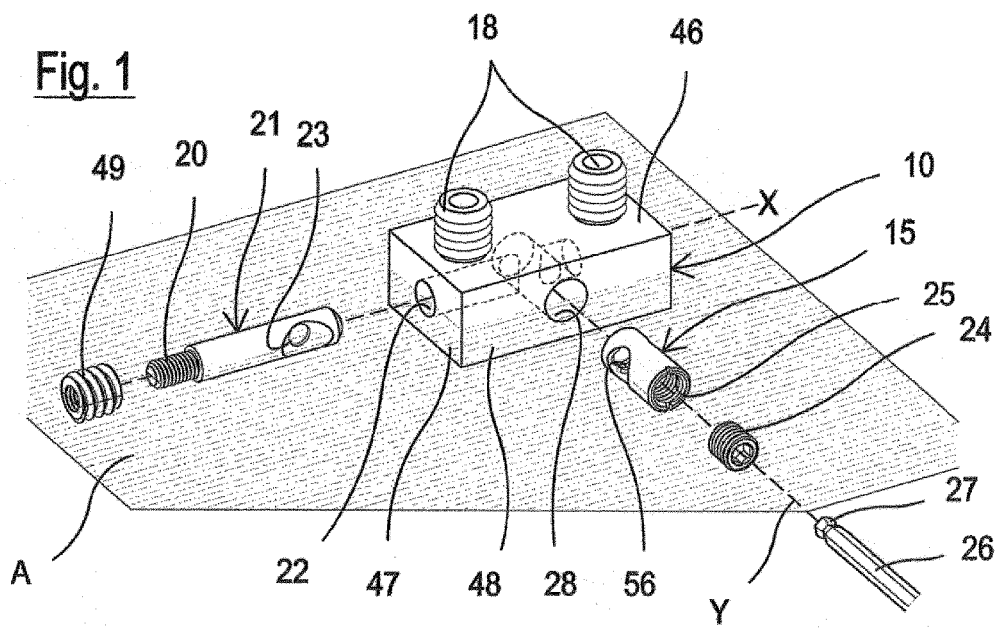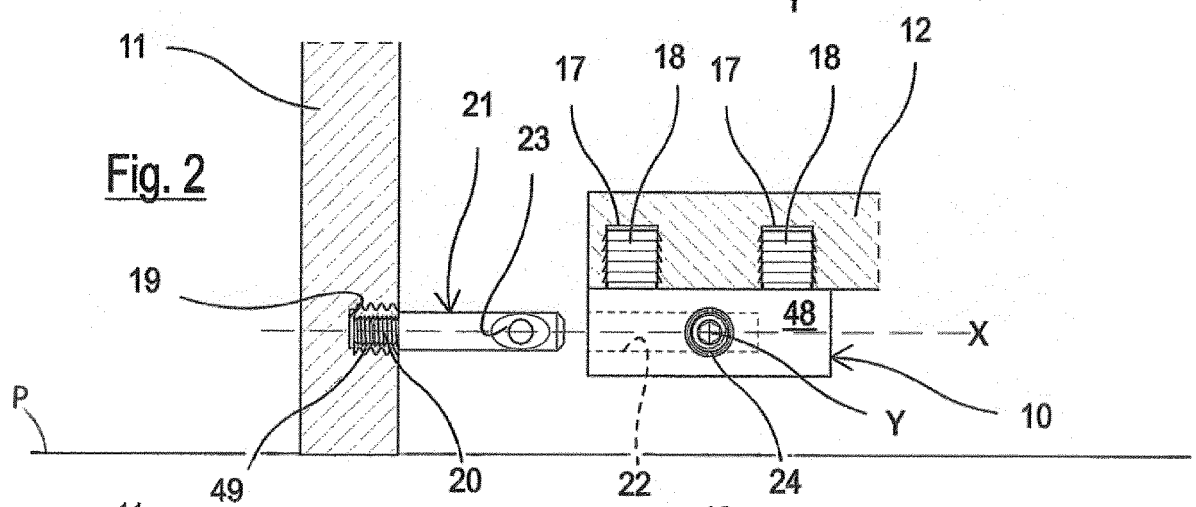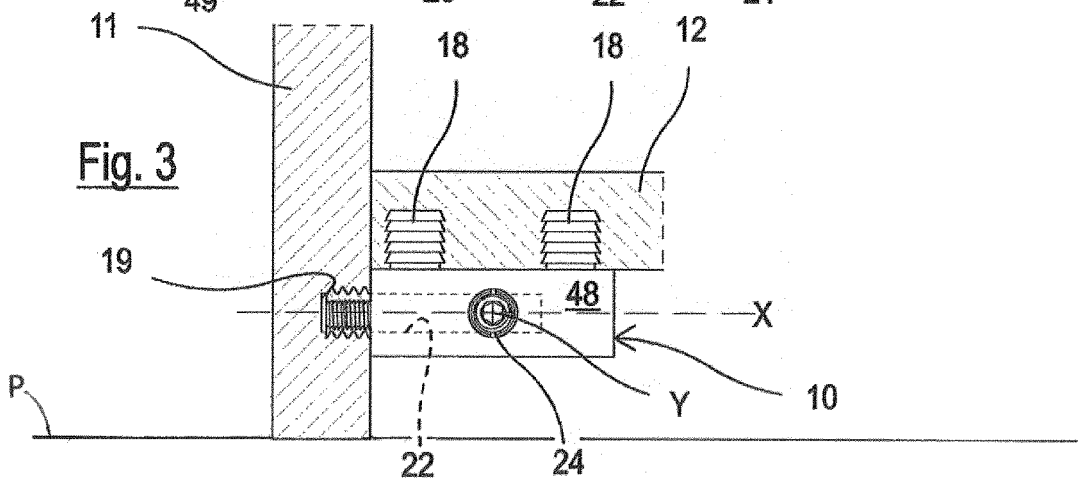

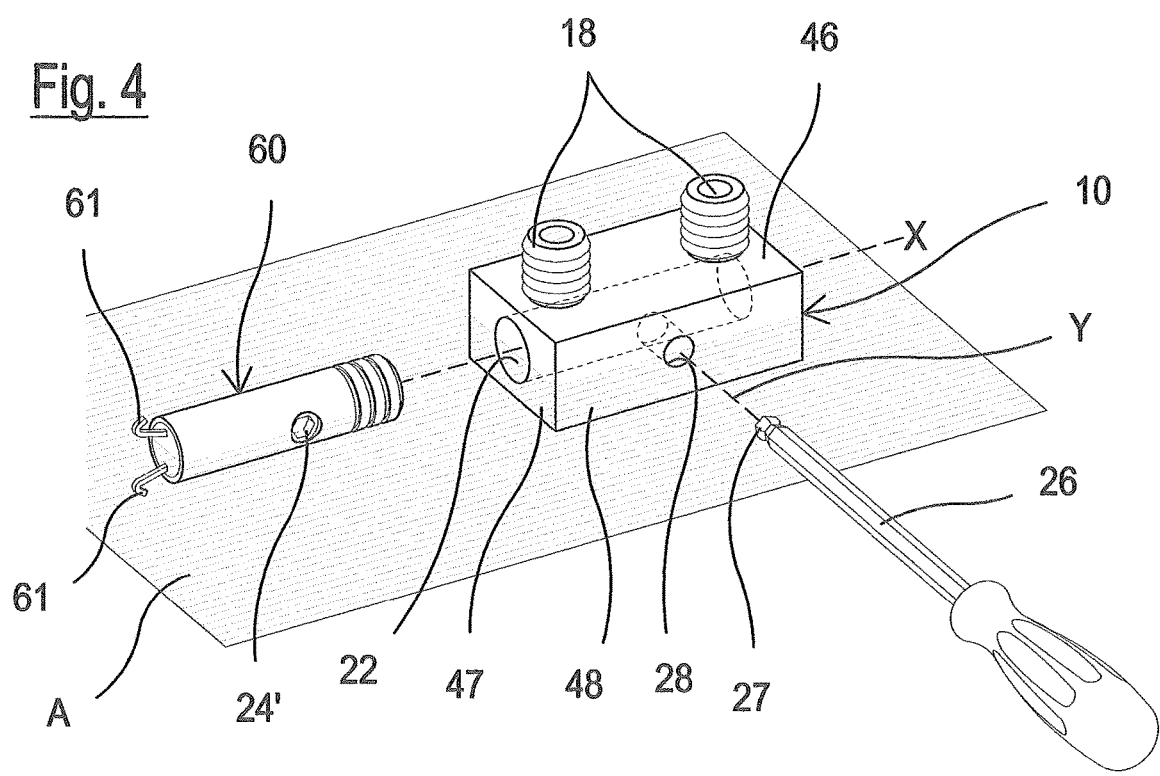
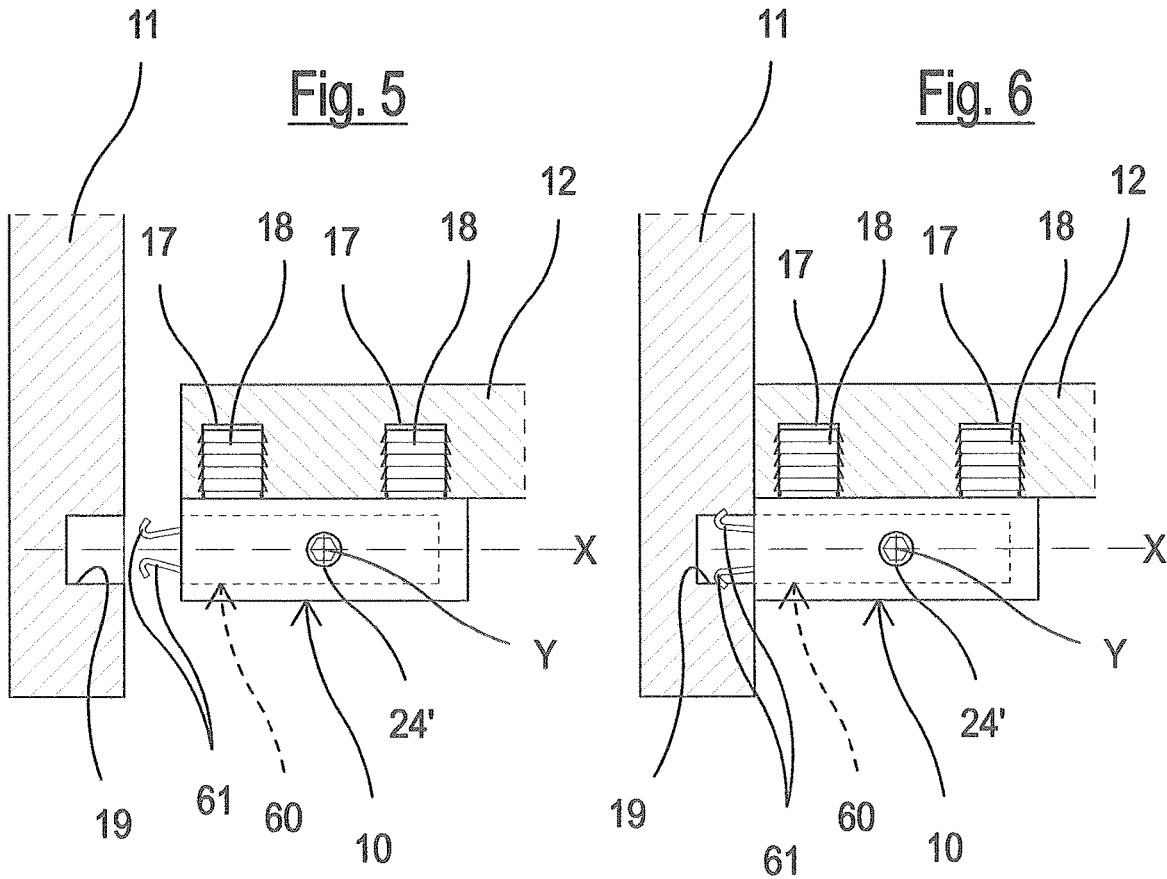

JOINT FOR THE FIRM INTERCONNECTION OF A FIRST AND A SECOND PANEL OF FURNITURE AND OTHER FURNISHING ITEMS

The present invention relates to a joint for the firm interconnection of a first and a second panel of furniture and other furnishing items.

Various types of joints are known, such as that object of European patent application EP 930436 A1 which comprises a cam element for actuating expandable gripping means or in any case, a mechanism for actuating the joint, which require holings in the panels, having a certain complexity.

Other systems are also known for joining a panel or shelf or base or bottom of a piece of furniture and a shoulder or other panel of a piece of furniture in the furnishing industry in general. In these further examples, the joining is effected by positioning a pin screwed into a hole of the shoulder and, for example, a butt or similar joining element inserted in a hole formed in the shelf or bottom or base of the furniture.

In order to produce this type of joint, a hole must be made in the shelf, bottom or base of the piece of furniture, said hole receiving the butt or similar joining element which, in turn, houses a grub screw in a threaded portion of the same. This hole is not very acceptable for the user, even if covered by a suitable cap in an attempt to restore the aesthetical appearance of the parts involved in the joining. FR 2333991 A1, EP 930436 A1 and SE 1300329 A1 show joint devices of the above type.

Furthermore, the presence of caps causes hindrances and obstacles for the positioning of objects on the bottom or base of the furniture, in any case creating disturbance for the user.

It should also be taken into account that an activation from above, in particular for lower joints, is not always easy, in the presence of limited spaces between shelves or minimum distances from the bottom of the furniture or rear wall of the furniture, and, as already indicated, visible holes are required which are greatly criticized by the users.

The general objective of the present invention is therefore to provide a relatively hidden joint, which provides for a front activation between a panel or shelf or base or bottom of a piece of furniture and a shoulder or other panel of a piece of furniture capable of solving the drawbacks of the known art mentioned above, in a simple, economical and functional manner.

A further objective of the present invention is to provide a joint between two panels which, in addition to having a minimum visibility on the part of the observer, and therefore a high aesthetical value, can be easily accessible, even from a free area between the bottom and floor where the furniture is positioned.

Another objective of the present invention is to provide a joint between portions of vertical walls and the bottom and shelves of a piece of furniture or furnishing item, which does not create a significant encumbrance and is adjacent between a panel or shelf or base or bottom of a piece of furniture and a shoulder or other panel of a piece of furniture, also even between the bottom or base and the floor.

The above objectives are achieved by a joint produced according to the independent claim 1 and following subclaims.

The structural and functional characteristics of the present invention and its advantages with respect to the known art will appear even more evident from the following description, referring to the enclosed schematic drawings, which show embodiment examples of the invention itself, all having the same innovative concept. In the drawings:

FIGS. 1, 2 and 3 are an exploded perspective view, an exploded sectional raised side view and an assembled sectional raised side view of a first embodiment of a joint for firmly interconnecting a first and a second panel of furniture and other furnishing items produced according to the present invention with a joint container and joint casing for a pin and butt with front activation;

FIGS. 4, 5 and 6 are an exploded perspective view, an exploded sectional raised side view and an assembled sectional raised side view of a second embodiment of a joint for firmly interconnecting a first and a second panel of furniture and other furnishing items produced according to the present invention with a joint container and joint casing in a single element;

Figure 7:
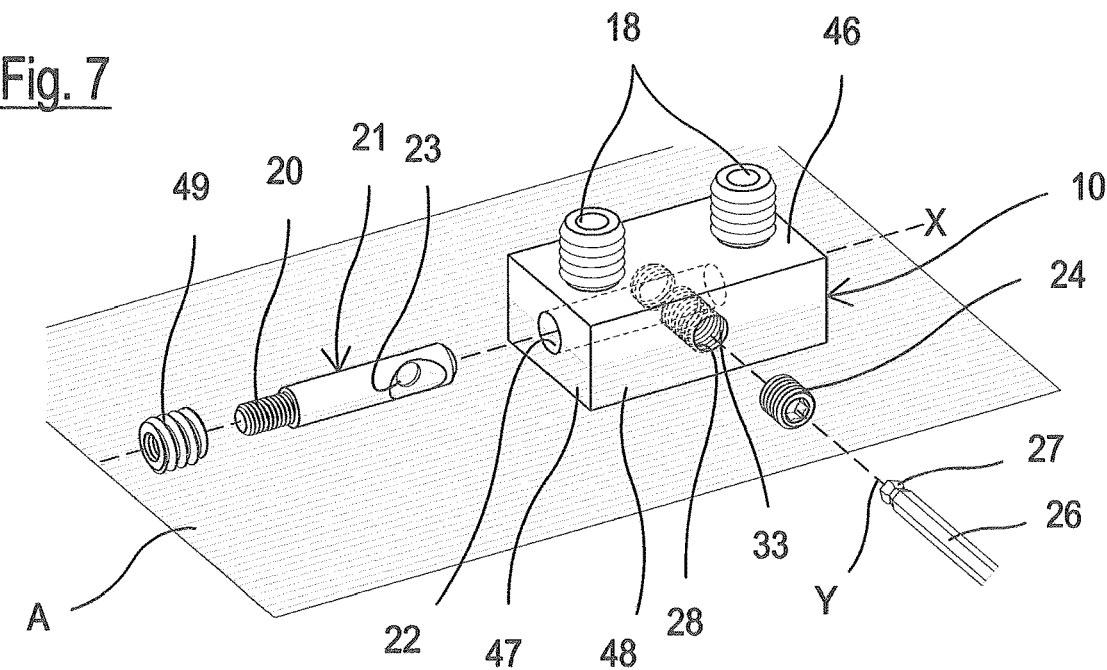
FIGS. 7, 8 and 9 are an exploded perspective view, an exploded sectional raised side view and an assembled sectional raised side view of a third embodiment of a joint for firmly interconnecting a first and a second panel of furniture and other furnishing items produced according to the present invention with a container englobing a pin joint and a butt with front activation.

With reference in general to the figures, these show embodiments of a joint for firmly interconnecting a first and a second panel of furniture and other furnishing items produced according to the present invention.

In the various figures, in fact, it is envisaged that a first panel 12 be firmly interconnected with a second panel 11. The first panel 12, for example, can be a shelf or a base or a bottom or other panel of a piece of furniture and the second panel 11 a shoulder of a piece of furniture. In this way, the first panel 12 and the second panel 11 are positioned perpendicular to each other.

This joint generally comprises a container 10 provided with at least one fixing element, such as a snap-in or pressure plug 18 (so-called "duebel") (or other equivalent fixing elements), which is housed in a blind hole 17 formed vertically in the first panel 12 downwards. In the examples, two plugs are shown, interspaced and positioned above the container 10, which are inserted in two holes 17 formed in the first panel 12, for example a bottom of a piece of furniture.

The container 10 also provides, either at least partially contained in the same or at least partially associated with the same, a plurality of interconnection and blocking components for joining and firmly blocking the two panels 12 and 11.

The examples proposed also show how, according to the present invention, all the components lie on the same plane A which is parallel and interspaced with respect to the first panel 12 and perpendicular with respect to the second panel 11.

More specifically, with respect to FIGS. 1 to 3, these show a first embodiment of a joint for firmly interconnecting a first and a second panel of furniture and other furnishing items produced according to the present invention.

FIG. 1 shows an exploded perspective view of a joint according to the invention without the two panels.

FIG. 1, in fact, shows a container 10, in the form of a prismatic body, which is provided above on a first side 46 with two plugs 18, spaced apart. Furthermore, consecutive holes 22, 28 intersecting each other, are provided on each lateral side 47, 48. A first hole 22 is directed according to an axis X which should be considered as being the main axis or joining axis. A second hole 28, which intersects with the first hole 22, is directed according to an axis Y which should be considered as being an activation axis of the joint. The two axes X and Y are perpendicular to each other and lie on the plane previously indicated as plane A, said plane being parallel and interspaced with respect to the first panel 12 and perpendicular with respect to the second panel 11.

FIGS. 2 and 3 show raised sectional views, one exploded and the other assembled, of a first embodiment of a joint 5 produced according to the present invention for firmly interconnecting a first and a second panel of furniture and other furnishing items.

In this first example, the container 10 is connected to the first panel 12, as it is positioned beneath the same with the two plugs 18 snap-inserted and blocked in the holes 17 of the first panel 12. The second panel 11 provides a horizontal blind hole 19 which defines a seat in which an internally threaded bushing 49 for receiving a threaded end 20 of a pin 21, is positioned.

The pin 21 is housed in the first hole 22, produced according to the axis X in the container 10, wherein the hole 22 is aligned with the hole 19 of the second panel 11, for example a shoulder of a piece of furniture. The pin 21 in its protruding part provides a housing 23 for a tip of a blocking grub screw 24.

The blocking grub screw 24 is screwed into an internal threaded hole 25 of a butt 15. The butt 15 is positioned in a hole 28 of the container 10, said hole being produced according to the axis Y, in a direction perpendicular to the blind hole 22 of the container 10, intersecting the same. The butt 15 provides a pass-through hole 56 for receiving the pin 21. In this way, the container 10 contains a joining unit positioned according to the activation axis Y of the joint.

In addition to showing the components of the joint, FIG. 1 also illustrates the functioning of the same.

Once the pin 21 is housed in the panel or shoulder (FIG. 2) and the butt 15 is inserted in the hole of the container 10, the container 10 itself is anchored beneath the first panel or bottom or shelf 12 by means of the plugs 18 inserted in the holes 17.

The parts are then compacted by moving the bottom or shelf 12 towards the shoulder 11 by inserting the pin 21 into the hole 22 of the container 10 (FIG. 3).

At this point, it is possible to act on the grub screw 24 of the butt 15 using a tool 26 and its shaped end 27. The grub screw 24 is activated in rotation until its tip is housed in the housing 23 of the pin 21, blocking the parts reciprocally.

All of this is possible thanks to the fact that the above-mentioned components at least partially contained or at least partially associated with the container 10 form an interconnection and a blocking for firmly joining and blocking the two panels 12 and 11.

In this way, it can be seen how a joint according to the invention is extremely simple and functional. Furthermore, said joint has front activation without the provision of visible holes in the panels of the furniture.

The activation of said plurality of interconnection and blocking components is effected in the front according to the activation axis Y which is perpendicular to the main axis X of the joint, wherein both of the axes are advantageously positioned on the same plane A parallel and interspaced with respect to the first panel 12 and perpendicular to the second panel 11.

It can also be noted how the holings in both panels are reduced to the minimum so as not to affect their resistance and capacity in the furniture.

With respect now to a further example among all the possible examples, it can be seen how FIGS. 4 to 6 show a second embodiment of a joint for firmly interconnecting a first and a second panel of furniture and other furnishing items produced according to the present invention.

In these figures, equivalent elements are indicated with the same reference numbers.

As for the previous example, FIG. 4 shows an exploded perspective view of a joint according to the invention without the two panels.

In this example, a joint in a single element 60 is provided, such as that described in EP 930 436 A1.

In this way, all the mechanisms of the joint are contained in this single element 60. The single element comprises, for example, a cam element (not shown) for activating expandable gripping means 61 that are positioned inside the hole 19 of the second panel 11 for being anchored in the same.

In this example, the joint in a single element 60 is positioned according to the main axis X of the joint in a hole 22 of a container 10 associated with two panels 11, 12. As in the previous example, the first panel 12 only provides the two holes 17 for the plugs 18 which extend from the container 10.

It is therefore sufficient to act by means of the tool 26 according to the activation axis Y of the joint for activating the joining mechanism contained in the single element 60 on a screw 24' which activates the mechanisms inside the single element 60. This ensures the stable and final joining between the two panels 11, 12 of the furniture.

Also in this case, it can be seen that the joint has front activation without the provision of visible holes in the panels of the furniture. Its activation is effected in the front according to the activation axis Y which is perpendicular to the main axis X of the joint, wherein both axes are advantageously arranged on the same plane A, parallel and interspaced with respect to the first panel 12 and perpendicular to the second panel 11.

Figure 8:
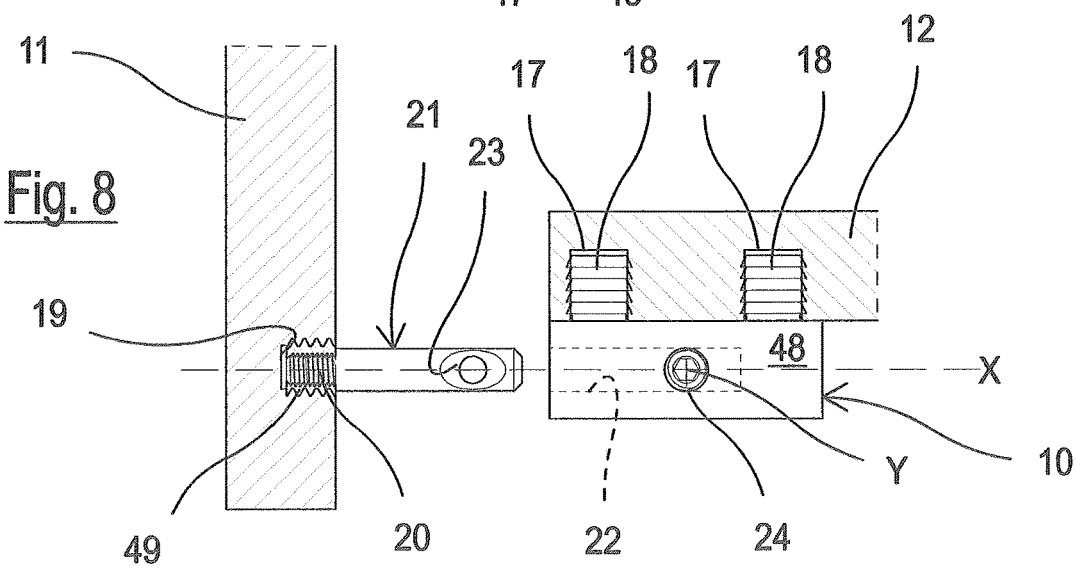
Figure 9:
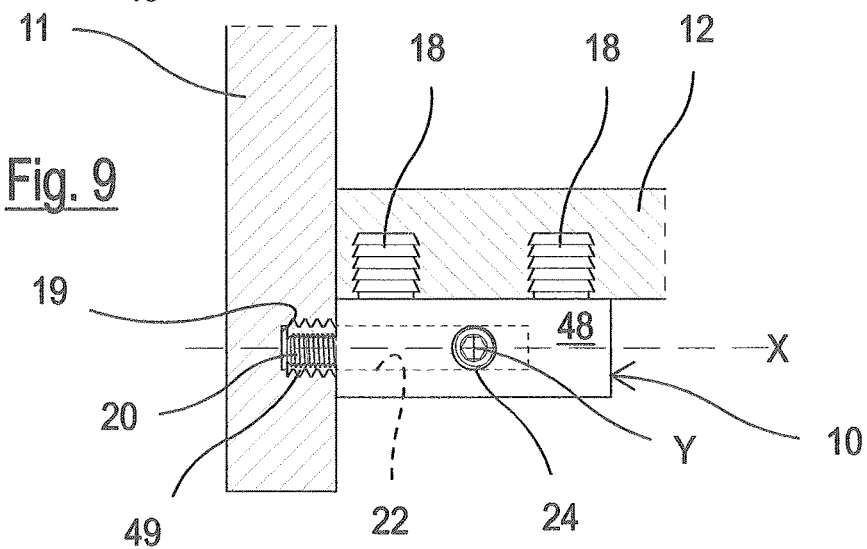

The last example among all the possible examples illustrates, in FIGS. 7 to 9, a third embodiment of a joint for firmly interconnecting a first and a second panel of furniture and other furnishing items produced according to the present invention.

The same elements are indicated, when possible, with the same reference numbers, referring to the description of the first example, when necessary for a clear understanding.

Also in this case, as for the previous example, FIG. 7 shows an exploded perspective view of a joint according to the invention without the two panels.

This example shows a joint in which a container 10 englobes a pin joint and butt with front activation, simplifying the construction of the previous examples.

The container 10, in fact, in its hole 28 produced according to the activation axis Y, provides an internal threading 33 in which a grub screw or screw 24 is inserted, such as that inserted in the butt 15.

In this way, the joining unit is arranged according to the activation axis Y of the joint.

FIG. 7 clearly shows how the activation is effected for implementing the stable positioning for the joint of FIGS. 7 to 9, shown assembled in FIG. 9.

The container 10 itself contains the joint whose interconnection and blocking components lie on the same plane A which is parallel and interspaced with respect to the first panel 12 and perpendicular with respect to the second panel 11.

Said plane A also contains, as for the previous examples, the activation axis Y and the main axis X of the joint, which is perpendicular to the activation axis Y.

It can therefore be clearly understood how, if the first panel 12 indicated above is a bottom or base of a piece of furniture, the activation of the joint is effected in the front in the space defined between the bottom 12 and the floor P on which the furniture is resting (FIGS. 2 and 3).

It can thus be seen how the solution to all the issues envisaged in the known art described above is provided by the joint according to the invention.

Primarily, all visible holes have been eliminated from the furniture and an adjustable joint has been provided which can be activated from a front position.

The elements of the joint have been minimized and are extremely simple to construct and use. The holings in the shoulders and in the bottom or base have also been minimized.

The advantages and innovative characteristics of a joint for firmly interconnecting a first and a second panel of furniture and other furnishing items are therefore evident.

The forms and structure for producing a joint according to the present invention, as also the materials and assembly modes, can naturally differ from those shown for purely illustrative and non-limiting purposes in the drawings.

The objectives mentioned in the preamble of the description have therefore been achieved.

The protection scope of the present invention is defined by the enclosed claims.

The invention claimed is:

1. A joint adapted for use between a shelf and a shoulder of furniture and other furnishing items for firmly interconnecting said shelf and said shoulder positioned perpendicular to each other, comprising:
   at least one fixing element configured to be fixed to said shelf; and
   a plurality of interconnection and blocking components for joining and firmly blocking said shelf and said shoulder together,
   wherein said shelf is parallel to a floor,
   wherein said plurality of interconnection and blocking components lies on a same plane, which is parallel to the floor and interspaced with respect to said shelf and perpendicular with respect to said shoulder,
   wherein said plurality of interconnection and blocking components is totally or at least partially contained in a container or at least partially associated with said container for joining and firmly blocking said shelf and said shoulder together, and
   wherein said container is positioned beneath said shelf and activation of said plurality of interconnection and blocking components is effected in a front of the joint, the front of the joint being perpendicular to the floor.

2. The joint according to claim 1, wherein, on said same plane, there is a first axis which forms a main axis or axis of the joint, and a second axis, which forms an activation axis of the joint, said first and said second axes being perpendicular to each other.

3. The joint according to claim 1, wherein said shelf has at least one hole for receiving said at least one fixing element, which extends from said container.

4. The joint according to claim 1, wherein said container has at least one hole for receiving a pin firmly positioned in a hole produced in said shoulder.

5. The joint according to claim 1, wherein said plurality of interconnection and blocking components of said joint comprises a grub screw inserted into a butt housed in a hole of the container of said joint associated with said shelf and said shoulder.

6. The joint according to claim 1, wherein said plurality of interconnection and blocking components of said joint comprises a screw or grub screw inserted in an internal threading of a hole of the container of said joint associated with said shelf and said shoulder.

7. The joint according to claim 1, wherein said plurality of interconnection and blocking components of said joint comprises a pin having one end housed in a first hole of the shoulder and another end housed in a second hole of the container, wherein said second hole is aligned with said first hole, both the first and the second holes being directed according to an axis, which forms a main axis or axis of the joint.

8. The joint according to claim 1, wherein the joint is produced by a single element, positioned in a hole of the container, said container being in turn positioned between said shelf and said shoulder, wherein said single element contains joining mechanisms, a free end of said single element being inserted in a hole of the shoulder to be anchored therein, said single element being arranged according to a main axis of the joint and providing a screw, which activates said joining mechanisms arranged according to an activation axis.

* * * * *